United States Patent
Bower et al.

(10) Patent No.: US 9,149,955 B2
(45) Date of Patent: Oct. 6, 2015

(54) PROCESS FOR RECYCLING IMMISCIBLES IN PET FILM

(75) Inventors: Douglas J. Bower, North Kingstown, RI (US); Arron Carroll, Cranston, RI (US); Satoshi Yamamoto, Lyons (FR)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 539 days.

(21) Appl. No.: 13/339,745

(22) Filed: Dec. 29, 2011

(65) Prior Publication Data

US 2013/0171411 A1    Jul. 4, 2013

(51) Int. Cl.

| | |
|---|---|
| *B32B 37/15* | (2006.01) |
| *B29C 47/10* | (2006.01) |
| *B29C 47/58* | (2006.01) |
| *B29C 47/68* | (2006.01) |
| *B29C 55/12* | (2006.01) |
| *B29D 7/01* | (2006.01) |
| *B29B 17/00* | (2006.01) |
| *B29B 17/02* | (2006.01) |
| *C08L 67/02* | (2006.01) |
| *C08L 67/03* | (2006.01) |
| *B29C 47/76* | (2006.01) |
| *B29C 47/08* | (2006.01) |
| *B29C 47/92* | (2006.01) |
| *B29C 47/66* | (2006.01) |
| *B32B 27/36* | (2006.01) |
| *C08K 5/00* | (2006.01) |
| *B32B 38/00* | (2006.01) |
| *B32B 37/00* | (2006.01) |
| *B29C 47/00* | (2006.01) |
| *B29L 9/00* | (2006.01) |
| *B29K 67/00* | (2006.01) |
| *B29L 7/00* | (2006.01) |

(52) U.S. Cl.
CPC ............ *B29B 17/0026* (2013.01); *B29B 17/02* (2013.01); *B29C 47/0057* (2013.01); *B29C 47/0894* (2013.01); *B29C 47/663* (2013.01); *B29C 47/68* (2013.01); *B29C 47/76* (2013.01); *B29C 47/92* (2013.01); *B32B 27/36* (2013.01); *B29B 17/00* (2013.01); *B29B 17/0005* (2013.01); *B29B 17/0036* (2013.01); *B29B 2017/0213* (2013.01); *B29B 2017/0224* (2013.01); *B29C 47/0004* (2013.01); *B29C 47/0021* (2013.01); *B29C 47/0071* (2013.01); *B29C 47/0083* (2013.01); *B29C 47/10* (2013.01); *B29C 47/1027* (2013.01); *B29C 47/58* (2013.01); *B29C 55/12* (2013.01); *B29C 2947/92723* (2013.01); *B29C 2947/92742* (2013.01); *B29D 7/01* (2013.01); *B29K 2067/003* (2013.01); *B29L 2007/008* (2013.01); *B29L 2009/00* (2013.01); *B29L 2009/005* (2013.01); *B32B 37/0007* (2013.01); *B32B 37/15* (2013.01); *B32B 2038/0028* (2013.01); *B32B 2255/10* (2013.01); *B32B 2255/26* (2013.01); *B32B 2272/00* (2013.01); *B32B 2307/518* (2013.01); *C08K 5/0008* (2013.01); *C08K 5/0025* (2013.01); *C08L 67/02* (2013.01); *C08L 67/03* (2013.01); *Y02W 30/62* (2015.05); *Y02W 30/622* (2015.05); *Y10T 428/24355* (2015.01)

(58) Field of Classification Search
None
See application file for complete search history.

(56) References Cited

U.S. PATENT DOCUMENTS

| | | | | |
|---|---|---|---|---|
| 4,092,458 | A * | 5/1978 | Hoffman | 428/402 |
| 5,225,130 | A * | 7/1993 | Deiringer | 264/102 |
| 5,374,467 | A * | 12/1994 | Sato | 428/143 |
| 5,424,013 | A * | 6/1995 | Lieberman | 264/40.1 |
| 5,747,174 | A * | 5/1998 | Kimura et al. | 428/480 |
| 5,763,073 | A * | 6/1998 | Bertrand et al. | 428/338 |
| 5,824,394 | A * | 10/1998 | Kinoshita et al. | 428/195.1 |
| 5,885,501 | A * | 3/1999 | Gardner et al. | 264/216 |
| 6,056,901 | A * | 5/2000 | Hamatani et al. | 264/37.28 |
| 6,217,804 | B1 * | 4/2001 | Lieberman | 264/102 |
| 6,436,322 | B1 * | 8/2002 | Fredl | 264/85 |
| 6,703,138 | B1 * | 3/2004 | Taki et al. | 428/483 |
| 6,733,873 | B2 * | 5/2004 | Mizutani et al. | 428/216 |
| 6,742,529 | B2 * | 6/2004 | Imai et al. | 134/63 |
| 6,828,010 | B2 * | 12/2004 | Kubota et al. | 428/213 |
| 6,991,849 | B2 * | 1/2006 | Oya | 428/353 |
| 7,344,765 | B2 * | 3/2008 | Hayakawa et al. | 428/34.9 |
| 7,807,728 | B2 * | 10/2010 | Yokoyama et al. | 521/40 |
| 2004/0130059 | A1 * | 7/2004 | Kern et al. | 264/173.16 |
| 2005/0047267 | A1 * | 3/2005 | Gneuss et al. | 366/83 |
| 2006/0257760 | A1 * | 11/2006 | Mori et al. | 430/7 |
| 2006/0270806 | A1 * | 11/2006 | Hale | 525/439 |
| 2007/0161719 | A1 | 7/2007 | Rauh | |
| 2011/0168325 | A1 | 7/2011 | Ledbetter et al. | |

FOREIGN PATENT DOCUMENTS

| | | |
|---|---|---|
| EP | 1 434 680 | 7/2004 |
| GB | 2 030 472 A * | 4/1980 |

\* cited by examiner

*Primary Examiner* — Vivian Chen
(74) *Attorney, Agent, or Firm* — Morrison & Foerster LLP

(57) ABSTRACT

Described are methods for recycling biaxially oriented thermoplastic crystallizable films, such as polyester terephthalate (PET) films, that have been coated with various polymers or waxes that are immiscible in the primary molten thermoplastic. The resultant processed recycle can be used to make new biaxially oriented thermoplastic films while avoiding process instability and optical defects in the finished film associated with immiscible polymeric and/or wax coatings.

10 Claims, No Drawings

PROCESS FOR RECYCLING IMMISCIBLES IN PET FILM

FIELD OF THE INVENTION

This invention relates to methods of recycling thermoplastic biaxially oriented crystallizable films, such as polyester terephthalate (PET) films, coated or treated with various polymers or waxes that are immiscible in the primary molten thermoplastic. The recycled film is used to make new thermoplastic biaxially oriented films that do not contain surface or embedded optical defects or undesired mechanical property characteristics associated with using recycled film with immiscible coatings.

BACKGROUND OF THE INVENTION

As the cost of petrol based chemicals continues to rise, more economical ways to effectively reclaim scrapped materials are needed. In the case of biaxially oriented crystallizable thermoplastics films, the recycling of clean film is straight forward and well known. Difficulties arise when the films have been subsequently processed, having been coated, dyed, printed, laminated, or the like. Coatings may be applied in-line during the manufacturing of the film or may be applied off-line by any number of methods including solvent based, aqueous based, or extrusion coated. Many of these coatings are not miscible in the base polymer used in the original film making, rendering recycled film containing such coatings unsuitable for recycling into new biaxially oriented film. Immiscible coatings tend to agglomerate and cause both process and quality issues in the new film. Filters are typically used in the extrusion portion of the film manufacturing process to remove normal levels of contaminants from the coatings. These filters can also remove agglomerated coatings, however, when an appropriate mesh size is used to filter the agglomerates, the filters tend to clog rapidly thereby reducing the effective filter life and increasing production costs. Further, agglomerated coatings that pass through the filter can cause process instability during the orientation portion of the film manufacturing process and can also leave gels that appear as optical defects in the finished film.

Some biaxially oriented films made from recycled, coated, crystallizable, thermoplastics, in particular from crystallizable polyesters, are known.

For example, U.S. Publication No. 2011/0168325A1 describes a process for recycling coated waste film from a release liner application. However, there is no mention of compatibility issues with the residual coating. Further, the process is focused on increasing the IV and also describes the necessity of adding a coloring agent to mask yellowness associated with the recycling process.

U.S. Pat. No. 6,436,322 describes a process for recycling polyester terephthalate (PET) flakes characterized by extrusion under vacuum while homogenously injecting an inert gas, or steam, to strip the PET granulate of volatile contaminants. This process also calls for a subsequent step of solids re-condensation in the solid state in order to raise the IV to sufficient level for reuse in PET bottle making.

U.S. Publication No. 2007/0161719A1 describes a method of recycling immiscible and/or cross-linked scrap polymeric material using shear mastication by combining said material with an uncross-linked, lower molecular weight polymer. Following the high shear mastication portion of the recycling process, the described method relies on adding a lower molecular weight polymeric material to the recycled polymeric material at a critical point so as to prevent cross-linked particles from reforming molecular bonds

SUMMARY OF THE INVENTION

Described are methods of recycling thermoplastic biaxially oriented crystallizable films, such as polyester terephthalate (PET) films, coated or treated with various polymers or waxes that are immiscible in the primary molten thermoplastic. The recycled film is used to make new thermoplastic biaxially oriented films that do not contain surface or embedded optical defects or undesired mechanical property characteristics associated with using recycled film with immiscible coatings.

Additionally, processes for recycling thermoplastic biaxially oriented crystallizable films, such as polyester terephthalate (PET) films, coated or treated with various polymers or waxes that are immiscible in the primary molten thermoplastic and using these incompatible polymers or waxes as an intentional, functional additive in a PET film are described. The recycling process includes densifying the ground thermoplastic film and subsequently re-extruding the densified film under both vacuum and high shear so that the immiscible particles are uniformly dispersed and reduced in size sufficiently so that filter clogging issues, orientation process stability, and optical defects associated with these immiscible particles is avoided.

Unlike prior recycling methods, the intrinsic viscosity of the recycled film (IV) does not need to be increased but rather can be maintained sufficiently for reuse as film grade PET resin. Further, there is minimal degradation that would cause an unacceptable level of yellowing. In addition, inert gas stripping is unnecessary since immiscible particles can be macerated with high shear mixing sufficiently to allow the recycled PET to be used in the manufacture of PET films. Further, since the IV of the recycled film is maintained during extrusion re-condensation is unnecessary. In addition, sufficient dispersion of the immiscible polymeric materials can be achieved without the addition of lower molecular weight polymeric material.

One embodiment of a method for recycling a coated thermoplastic film coated with 0.1 wt %-20 wt % polymers or waxes that are immiscible in the molten thermoplastic includes densifying the coated thermoplastic film, feeding the densified coated thermoplastic film into a multi-screw secondary extruder with vacuum to form a molten polymer, filtering the molten polymer to produce a recycled resin, and producing a biaxially oriented thermoplastic film from the recycled resin. The resulting film does not contain surface or embedded optical defects larger than 100 microns.

The coated thermoplastic film may be densified, for example, using a pellet mill or a blade centrifuge. The recycled coated thermoplastic film may be a crystallizable film. The molten polymer may be filtered using a filter size of 50 microns or less. The biaxially oriented thermoplastic film including the recycled polymer may be produced using an extrusion process. The resulting biaxially oriented thermoplastic film may be a single layer or multilayer film.

The recycled coated thermoplastic film may include or primarily include (more than 50 wt. %) polyester terephthalate. The recycled coated thermoplastic film may include a coating including polyester, polypropylene, acrylic, polyurethane, polyvinyl amine, low density polyethylene, linear low-density polyethylene, or high density polyethylene. The coating may also include a slip agent, surfactant, de-foaming agent, or cross-linking agent.

In some embodiments, the coating may be wax based, for example, paraffin wax based.

In another embodiment, a biaxially oriented thermoplastic film is made from recycled coated thermoplastic film material. The recycled coated thermoplastic film material is produced by a process including densifying a coated thermoplastic film comprising a thermoplastic film and a coating of 0.1 wt %-20 wt % polymers or waxes that are immiscible in the molten thermoplastic, feeding the densified coated thermoplastic film into a multi-screw secondary extruder with vacuum to form a molten polymer, and filtering the molten polymer to produce the recycled coated thermoplastic film material. The resulting film does not contain surface or embedded optical defects larger than 100 microns comprising:

The biaxially oriented thermoplastic film may include a single layer or multiple layers. The film and/or each layer of the film may include 1-99 wt. % recycled coated thermoplastic film material. The biaxially oriented thermoplastic film may primarily include (more than 50 wt. %) polyester terephthalate. In an embodiment of a multilayer film, a base layer may include polyester terephthalate.

DETAILED DESCRIPTION OF THE INVENTION

Described are methods for recycling biaxially oriented thermoplastic crystallizable films, such as polyester terephthalate (PET) films, that have been coated with various polymers or waxes that are immiscible in the primary molten thermoplastic. The resultant processed recycle can be used to make new biaxially oriented thermoplastic films while avoiding process instability and optical defects in the finished film associated with immiscible polymeric and/or wax coatings.

The coatings described herein can be aqueous or solvent based dispersions and can be applied either in line during the manufacturing process of the film or as a subsequent coating and drying process. Typical polymeric coatings can be, for example, polyester, polypropylene, acrylic, polyurethane, polyvinyl amine, LDPE, LLDPE, HDPE, etc. or blend of polymers. Further, coatings may contain additives such as slip agents, surfactants, de-foaming agents, cross-linking agents, and the like. Still other coatings may be wax based and also may contain surfactants or other additive for film performance and process enhancement. The recycled resin can be used to make new biaxially oriented thermoplastic films comprising up to 99% of the recycled resin.

In some embodiments, the coating on the recycled film may be 0.1%-20% by weight of a styrene acrylic emulsion, more particularly 2%-10% by weight, and even more particularly 5%-7% by weight.

In some embodiments the coated film to be recycled is ground to a fine flake that can be subsequently densified in a pellet mill. A pellet mill is comprised of a ring die mill with radial slots throughout the die and is well known for use in pelletizing ground thermoplastic films. The ground flake is fed into the inside of the die and spreaders evenly distribute the flake. Two rollers then compress the flake through the die holes creating a pellet typically ¼" in diameter, although other dimensions may be used. The temperature of the die and rollers may be between 300° F. and 325° F., and more preferably between 310° F. and 320° F. Pellets can be either cut or allowed to fall from the die under their own weight creating random lengths from ¼" to 3", although other lengths may be used.

The resultant pellet is then fed through a multi-screw extruder where the polymer is mixed with high shear under vacuum, such as a multi-screw extruder manufactured by Gneuss Kunststofftechnik GMBH as described, for example, in EP1434680B1. Temperatures for processing PET film recycle may range from 350° F. to 650° F., more particularly from 400° F. to 550° F., and most preferably from 420° F. to 540° F. In particular, the multi-screw extruder equipment has 3 zones for temperature set values and the preferred temperature range for each zone 1, 2, and 3 is 450° F.-460° F., 430° F.-440° F., and 535° F.-550° F., respectively. Ideal vacuum conditions are generally 0-2 mbar, preferably 0-1 mbar, and most preferably 0.1-0.3 mbar. Adjustments to the vacuum pressure can be made to maintain melt viscosity >150 pa·s, more preferably >180 pa·s, and most preferable >200 pa·s.

The multi-screw extrusion system in addition to creating high shear also functions to maximize the surface area of the molten polymer to allow volatiles present in the melt to be removed via the vacuum system. Similarly, water is also removed to prevent intrinsic viscosity (IV) degradation. Following extrusion, the molten polymer passes through filtration, for example a 50 micron cut, or a 20 micron cut, as is known in thermoplastic extrusion, to remove larger contaminants that may be present. The high shear renders the immiscible particles generally less than 100 microns and more preferably less than 40 microns, and even more preferably less than 5 microns, so that optical defects are not apparent in the new film made from the recycled resin. Further, the dispersion of the immiscible polymers is sufficient so that said polymers do not re-agglomerate while in the molten state, either during the recycling process or in the subsequent process of making new film from the recycled resin.

In a particular embodiment the biaxially oriented thermoplastic films that form the base of the coated films is polyester terephthalate (PET). Film structures can be single or multilayer and recycle from the present invention can be added to any layer or even all layers simultaneously.

In some embodiments, the coated film to be recycled cannot be densified in a pellet mill due to the very low friction imparted to the surface of the film by the coating. The initial densification step is used since the bulk density of the ground film (<1 lb/ft³) would prevent practical extrusion due to the low feed rate on a weight per time basis. In such cases where the coating may be, for example waxed based, the coated scrap film may be ground and fed into a bladed centrifuge. The heat generated by friction through mechanical means allows the coated film to partially melt and stick together yielding a densified but non-uniform pellet shaped thermopolymer. The resultant non-uniform pellet stream can then be fed through the same previously mentioned multi-screw extruder, such as the multi-screw extruder manufactured by Gneuss Kunststofftechnik GMBH and described in EP1434680B1. In the multi-screw extruder, the polymer is mixed with high shear under vacuum and passed through filtration, for example a 20 micron cut, to remove any larger contaminants that may be present.

For PET films, the polyester polymer utilized in the films, either in a recycled film portion or an additional polymer portion to be combined with recycled polymer when making a new film, can be made with Dimethyl Terephthalate and ethylene glycol (DMT method) as primary raw materials or with terephthalic acid and ethylene glycol (PTA method) as primary raw materials. Any number of typical esterification or transesterification catalysts can be used for the PTA or DMT method respectively as are well known to someone skilled in the art.

In one embodiment, a PET polymer can be obtained by esterification of terephthalic acid and ethylene glycol in a nitrogen atmosphere at a slightly elevated pressure (up to 2 atm) and a temperature of 190-220° C., followed by polycocondensation of the resulting diester in the presence of a polymerization catalyst under conditions of high vacuum and melt temperature 275-285° C. Preferred polymerization catalysts include antimony compounds, germanium compounds and titanium compounds.

When making new film from recycled film, either alone or in combination with unrecycled polymer, the film structure can be one or more layers. The single or multi-layer PET films may include particulate agents for friction control as is also well known in the art. The blended components of each layer may be dried and extruded according to known methods. In the case of multi-layer films the extruded melt streams of each layer may be fed through a joining zone where the layers are laminated into a multi-layer structure and then cast onto a chilled roll. After casting, the film may be oriented in the machine direction.

In one particular embodiment, a coating, or coatings, can be applied to either or both sides of the film following machine direction orientation but prior to transverse orientation. Subsequently, the film may be oriented in the transverse direction via stretching tenter frame and heat set to control physical properties of the film as is well known in the art.

In another particular embodiment, a coating, or coatings, can be applied to either or both sides of the film as a subsequent and completely separate process from film making.

The invention will be better understood with reference to the following examples, which are intended to illustrate specific embodiments within the overall scope of the invention.
Test Methods The films and polymers described in the Examples were tested using the following methods, standards and equipment.

Intrinsic Viscosity (IV) of PET: ASTM D4603

Film haze: ASTM D1003-95.

Film surface friction. ASTM D1894

Film surface tension. ASTM D7490

Film gel count inspection: Internal method

Equipment: Polarized light source, polarized screen, polarized microscope.

Conditions: Use polarized light source and polarized screen to count total number of gels. Use polarized microscope for gel measurement. Levels of unacceptable level of agglomerates in the film is defined as any of the following: more than ten that are 100-500 microns in size, more than five that are 501-1500 microns in size, or more than two that are greater than 1500 microns in size.

EXAMPLES

Comparative Example 1

Reclaimed acrylic coated PET was ground and processed through a pellet mill with no further processing prior to being added back into new film as provided in Table 1. The resultant recycle contained agglomerates determined to be undispersed acrylic coating. Comparative Example 4 shows the impact of undispersed coating particles in film.

Comparative Example 2

Reclaimed acrylic coated PET ground and processed through a pellet mill as provided in Table 1. A secondary process of re-extruding the pellet via a single screw and passing the molten polymer through a 20 micron cut filter to remove agglomerated acrylic coating particles/gels was then performed. This method failed due to rapid filter clogging within <0.3% of normal filter life.

Example 3

Reclaimed acrylic coated PET ground and processed through a pellet mill as provided in Table 1. A secondary process of re-extruding the pellet via a multi-screw extruder under vacuum and subsequently passing the molten polymer through a 20 micron cut filter to remove any contaminants including residual agglomerated acrylic coating particles/gels was performed. The filter performance of the secondary extrusion process was normal—meaning that the pressure rise/time was similar to re-extruded PET recycle of the same base film that does not contain any coatings.

Comparative Example 4

A 3-layer PET film made with 10% reclaimed acrylic coated PET in the core layer was produced. The reclaimed coated film was ground and processed through a pellet mill with no further processing prior to being re-extruded back into new film. The resultant new film contained gels visible to the naked eye without special lighting, which were determined to be agglomerates of or undispersed acrylic coating. Resultant film was not acceptable as A-grade film as specified under Test Methods: Film Gel Count Inspection. The specifications for this film are provided in Table 2.

Example 5

A 3-layer PET film made with 10% reclaimed acrylic coated PET in the core layer similar in structure to comparative example 4 was produced. The reclaimed coated film was ground and processed through a pellet mill. The resultant pellet was subjected to a subsequent process of re-extruding said pellet via a multi-screw extruder under vacuum and then passing the molten polymer through a 20 micron cut filter to remove any contaminants including residual agglomerated acrylic coating particles or gels. The resultant new film contained no gels visible to the naked eye and was acceptable as A-grade film as specified under Test Methods: Film Gel Count Inspection. The specifications for this film are provided in Table 2.

Examples 6-10

Three-layer PET films made with 10%-90% reclaimed acrylic coated PET in the skin layer were produced. The reclaimed coated film was ground and processed through a pellet mill with a subsequent process of re-extruding said pellet via a multi-screw extruder under vacuum and passing the molten polymer through a 20 micron cut filter to remove any contaminants including residual agglomerated acrylic coating particles. The resultant new film contained no gels visible to the naked eye and was acceptable as A-grade film as specified under Test Methods: Film Gel Count Inspection. The specifications for these films are provided in Table 2.

Comparative Example 11

A 3-layer PET film made without reclaim was produced. The resultant film contained no gels visible to the naked eye and was acceptable as A-grade film as specified under Test Methods: Film Gel Count Inspection. The specifications for this film are provided in Table 2.

Comparative Example 12

A two-layer PET film without recycle in either layer was produced. The specifications for this film are provided in Table 3.

Example 13

A two-layer PET film comprising of 50% of a wax coated recycled film in one layer to change friction and surface tension of said layer, wherein the recycled film is 0.05% by weight paraffin wax was produced. The data shows that the amount of wax coated PET recycle being used as a functional additive and dispersed within the PET can be adjusted to target the desired friction and surface tension properties. The specifications for this film are provided in Table 3.

Example 14

A two-layer PET film comprising of 75% of a wax coated recycled film in one layer to change friction and surface tension of said layer, wherein the recycled film is 0.05% by weight paraffin wax was produced. As with Example 13, the data shows that the amount of wax coated PET recycle being used as a functional additive and dispersed within the PET can be adjusted to target the desired friction and surface tension properties.

TABLE 3

Films with Wax Coating Recycle Examples

| Example | Film Type Description | % Wax Coating in Recycled film | % Wax Coated Recycle in One Layer | Top/bottom Friction ($\mu s/\mu d$) | Surface Tension of Modified Layer (mN/m) |
|---|---|---|---|---|---|
| 12 | 2-layer PET Film 'B' (Comparative) | 0.05% | 0 | 0.7/0.4 | 42 |
| 13 | 2-layer PET film 'B' with one layer modified | 0.05% | 50 | 0.38/0.35 | 38 |
| 14 | 2-layer PET film 'B' with one layer modified | 0.05% | 75 | 0.37/0.32 | 29 |

The above description is presented to enable a person skilled in the art to make and use the invention, and is pro-

TABLE 1

Recycle Examples

| Examples | Recycle Type Description | Coating weight % of total film structure | Pellet mill processing | Secondary Extrusion processing | Filter cut ($\mu m$) | Secondary Extrusion Comments |
|---|---|---|---|---|---|---|
| 1 comparative | Acrylic coated PET film recycle 'Type PM' | 5.9% | Yes | None | N/A | N/A - To be used directly in new film as is |
| 2 comparative | Acrylic coated PET film recycle 'Type RIK' | 5.9% | Yes | Single screw, low shear, no vacuum | 20 | Rapid extrusion shutdown due to high filter pressure |
| 3 | Acrylic coated PET film recycle 'Type GS' | 5.9% | Yes | Multi-screw, high shear with vacuum | 20 | No extrusion issues. Excellent filter life |

TABLE 2

Films with Acrylic Coating Recycle Examples

| Example | Film Type Description | (Layers) Structure | Type and % Recycle. (layer) | Top/bottom Friction ($\mu s/\mu d$) | Surface Tension | Haze | Comments, Film Inspection Results |
|---|---|---|---|---|---|---|---|
| 4 | PET Film F (comparative) | (3) A/B/A | 10% type PM (layer B - core) | — | — | — | Unacceptable visual results |
| 5 | PET Film G | (3) A/B/A | 10% type GS (layer B - core) | — | — | — | Excellent visual quality, no gels |
| 6 | PET Film A | (3) A/B/A | 40% type GS (layer A - skin) | 0.37/0.35 | 43.7 | 3.5 | Excellent visual quality, no gels |
| 7 | PET Film B | (3) A/B/A | 90% type GS (layer A - skin) | 0.37/0.34 | 41.2 | 3.5 | Excellent visual quality, no gels |
| 8 | PET Film C | (3) A/B/A | 10% type GS (layer A - skin) | 0.38/0.35 | 44.3 | 3.1 | Excellent visual quality, no gels |
| 9 | PET Film D | (3) A/B/A | 20% type GS (layer A - skin) | 0.37/0.34 | 45.0 | 3.4 | Excellent visual quality, no gels |
| 10 | PET Film E | (3) A/B/A | 30% type GS (layer A - skin) | 0.37/0.35 | 46.2 | 3.0 | Excellent visual quality, no gels |
| 11 | PET Film H comparative) | (3) A/B/A | 0% Recycle | 0.37/0.34 | 42.0 | 3.2 | Excellent visual quality, no gels | vided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A method for recycling a coated thermoplastic film coated with 0.1 wt %-20 wt % polymers or waxes that are immiscible in the molten thermoplastic comprising:
   - densifying a ground coated thermoplastic film using a blade centrifuge, wherein a bulk density of the ground coated thermoplastic film is less than 1 lb/ft$^3$;
   - feeding the densified coated thermoplastic film into a multi-screw secondary extruder with vacuum to form a molten polymer;
   - filtering the molten polymer to produce a recycled resin; and
   - producing a biaxially oriented thermoplastic film from the recycled resin, wherein the film does not contain surface or embedded optical defects larger than 100 microns.

2. The method of claim 1, wherein the molten polymer is filtered using a filter size of 50 microns or less.

3. The method of claim 1, wherein the producing a biaxially oriented thermoplastic film comprises an extrusion process.

4. The method of claim 1, wherein the produced biaxially oriented thermoplastic film is a multilayer film.

5. The method of claim 1, wherein the recycled coated thermoplastic film is a crystallizable film.

6. The method of claim 1, wherein the recycled coated thermoplastic film comprises polyester terephthalate.

7. The method of claim 1, wherein the recycled coated thermoplastic film comprises a coating comprising polyester, polypropylene, acrylic, polyurethane, polyvinyl amine, low density polyethylene, linear low-density polyethylene, or high density polyethylene.

8. The method of claim 1, wherein the recycled coated thermoplastic film comprises a coating comprising a slip agent, surfactant, de-foaming agent, or cross-linking agent.

9. The method of claim 1, wherein the recycled coated thermoplastic film comprises a coating that is wax based.

10. The method of claim 9, wherein the coating comprises paraffin.

* * * * *